Feb. 21, 1967 S. A. BEACH 3,305,212
AIR VALVE APPARATUS
Filed Oct. 7, 1964
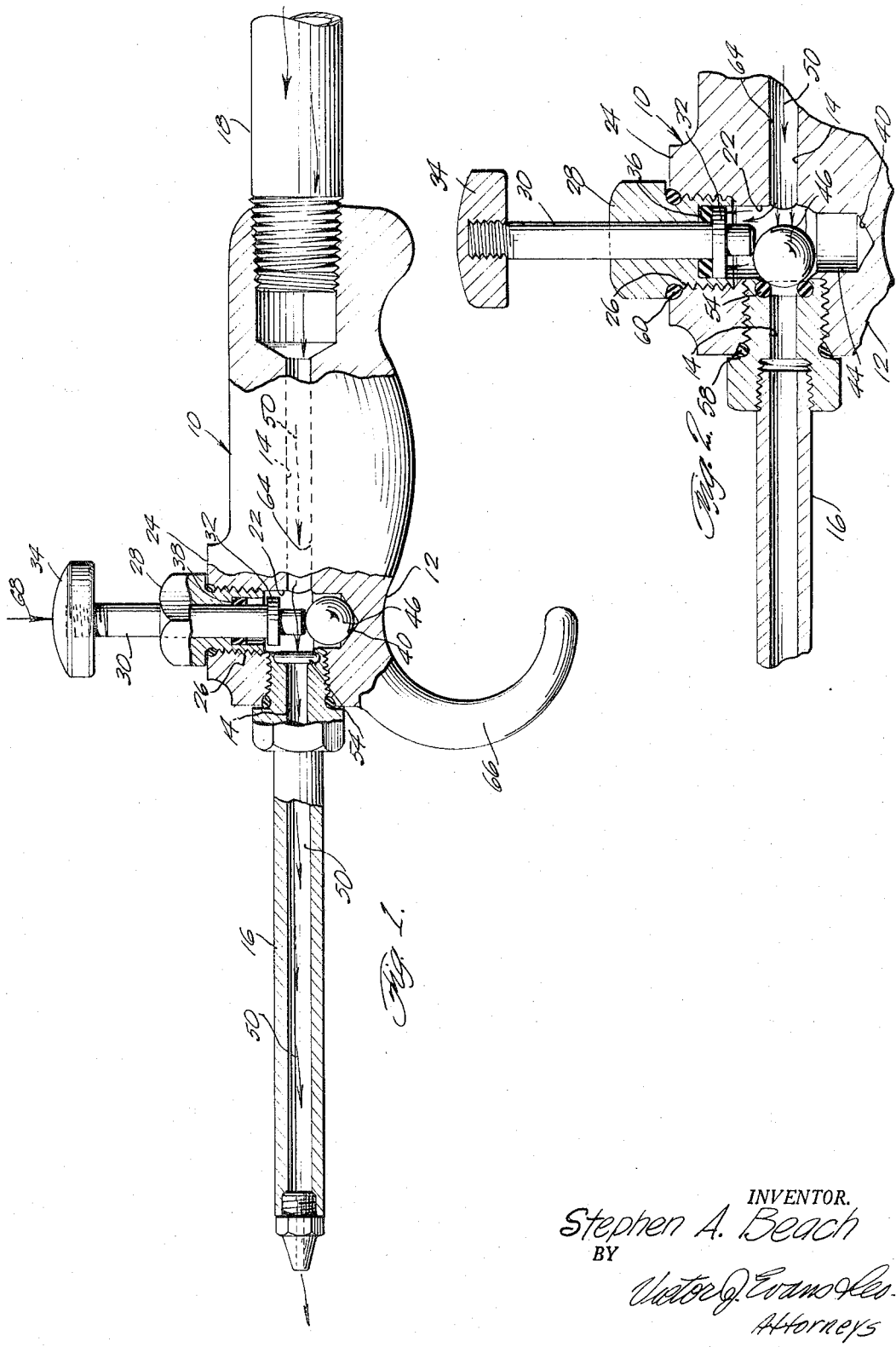
INVENTOR.
Stephen A. Beach
BY
Victor J. Evans & Co.
Attorneys

United States Patent Office 3,305,212
Patented Feb. 21, 1967

---

3,305,212
AIR VALVE APPARATUS
Stephen A. Beach, 52 Humboldt St.,
Wood-Ridge, N.J. 07095
Filed Oct. 7, 1964, Ser. No. 402,184
5 Claims. (Cl. 251—320)

The present invention relates to valves, and more particularly to a manually controlled ball type valve that is of inexpensive construction and simple manufacture, in which a stem displaces a ball from an O-ring for providing a by-pass path for the passage of air through the valve.

An advantage of the invention is that there is provided an improved air valve that may be used in cleaning machined parts of metal chips that may be in and about machined working parts, and also for cleaning out internal boring so that accurate and correct measurements of the bore may be made after air has been applied from the air valve of the invention. Other and improved numerous uses of the improved air valve will appear to those skilled in the art, and it will be found that the ball and O-ring provide a durable and easily operated unit. There are no springs necessary in actuating or returning any of the movable parts to their initial position, since the air valve and its components are operated and returned to their initial positions by the force due to the air pressure in the line.

It is contemplated to be within the scope of the present invention to actuate the air valve of the invention by depressing a cap on a stem so that the ball operates as a valve with the O-ring.

A further object of the invention is to provide a hook on the bottom side of the valve body to provide a safety mounting means so that the air valve and nozzle arrangement may be hooked on the side or any part of the machine, or other convenient mounting other than being hung from the ceiling. It has been found that hanging the air valve from the ceiling has created certain dangers, and that the hook provided on the body of the improved air valve eliminates the dangers and provides a safety precaution.

These as well as further advantages which are inherent in the invention will become apparent from the following description, reference being had to the accompanying drawing, wherein:

FIGURE 1 is side elevational view shown substantially in cross-section of the improved air nozzle in accordance with the preferred embodiment of the present invention, in which the ball valve is displaced from the O-ring, and FIGURE 2 is a broken away cross-sectional elevational view of the improved air valve in which the ball is seated on the O-ring.

Referring now to the drawing, there is illustrated an air valve 10 having a valve body 12 in which there is a longitudinal bore 14 extending throughout the length of the body 12. A nozzle 16 is secured to the forward end of the body 12, and a pipe or hose connection 18 is shown connected to the rear portion of the body 12 in FIGURE 1.

A lateral bore 22 is provided to extend from the longitudinal bore 14 to the peripheral portion 24 of the body 12 so that a complete path is provided. The lateral bore 22 is provided with a threaded portion 26 to provide a secure connection for a seat gland or seat fitting 28 which is provided with an opening to receive a stem 30 having a plunger 32 at one end thereof and a cap 34 at the other.

The seat fitting 28 is provided with a cavity 36 for receiving the plunger, and the diameter thereof is in alignment and is coaxial with the lateral bore 22 that is proximate to the longitudinal bore 14. The plunger 32 engages a packing or O-ring type material 38 which is positioned outwardly of the plunger 32 and in the recess of the cavity 36.

There is a cavity 40 that is generally an extension of the lateral bore 22, but the forward edge 44 thereof is defined so that a ball 46 will generally define a rearward arc as it moves from the position shown in FIGURE 2 to that shown in FIGURE 1, rearward as defined with respect to the air flow shown in dotted and full lines 50, as shown in FIGURES 1 and 2 respectively.

There is also provided a seat comprising an O-ring 54 that engages the ball as shown in FIGURE 2 so that the longitudinal bore 14 is securely and completely closed off. Other O-rings 58, 60, are provided to secure a sealing means between the body and the attending parts. A reduced portion or neck 64 is shown in FIGURES 1 and 2 so that there is a reduced section from the pipe 18 as the air passes as shown in line 50 to the lateral bore 22. In this way the ball 46 is now able to pass and communicate with the pipe or line 18. Similarly the O-ring 54 retains the ball 46 in the lateral bore so that it is only displaced from the O-ring into the cavity 44, and to its return position engaging the O-ring 54 when the plunger is in the upward position as shown in FIGURE 2. The edge 44 is provided so that the ball is assured of its rearward displacement, and when the plunger is moved into the upward position, the air as shown in lines 50 in FIGURE 1 is such that it draws the ball 46 upwardly and into engagement with the O-ring 54.

A hook 66 is provided so that the valve body may be easily attached and secured for temporary storage so that the valve body may not be positioned in a dangerous and unsafe condition by hanging from a ceiling or otherwise, but that the valve body may be hung advantageously from the equipment or machine to which it is used.

The air valve is operated by air pressure from a compressor through air lines connected to the pipe 18 and by a simple depression of the cap 34 as shown by the arrow 68 in FIGURE 1, the pressure will provide for passage of the air through the nozzle shown by lines 50 therein and the air valve is usefully providing an air flow to clean out internal borings or other advantageous uses.

When the air flow is desired to cease, one merely needs to remove the force shown by arrow 68 so that the incumbence air forces in the lateral cavity will provide for displacing the plunger 32 into an upward position and replace the ball 46 into engagement with the O-ring 54, so that the valve stops the passage of air through the air body, and the air pressure is used to maintain the ball in engagement with the O-ring 54 and the stem 30 is positively held in the upward position.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A fluid valve comprising a body having a longitudinal bore defined therethrough with a substantially vertical intersecting bore intersecting said longitudinal bore, a seat fitting member connected into said intersecting bore, a stem extending through said seat fitting and having a plunger portion of wider diameter than said stem located in said intersecting bore, said seat fitting having an interior recess portion defined in a face adjacent said plunger portion in which said plunger portion is slidable, an O-ring disposed in said recess and around said stem adjacent said plunger portion and providing a seal in said recess portion of said seat fitting, said plunger being movable away from said longitudinal bore on application of fluid pressure to said longitudinal bore, said intersecting bore defining a cavity below said longitudinal bore, said body having a valve seat formed around the longitudinal bore at the juncture with said intersecting bore on the downstream side, an O-ring positioned in said valve seat, a ball in said intersecting bore adapted to be forced into seating engagement with said O-ring by fluid pressure flowing through said longitudinal bore toward said valve seat, said stem being depressible from the exterior of said seat fitting to cause said plunger portion to move the ball downwardly into said cavity to permit a flow of fluid through said longitudinal bore and through the portion thereof formally covered by the ball on said valve seat.

2. A fluid valve according to claim 1, including a nozzle member threaded to said body member and forming a portion of said longitudinal bore terminating at its inner end in the valve seat.

3. A fluid valve according to claim 1, wherein said plunger portion includes a portion of substantially the same diameter as the stem and a widened collar portion spaced from the lower end thereof.

4. A fluid valve according to claim 1, wherein said body includes a bore of wider diameter than said longitudinal bore connecting said longitudinal bore upstream of said valve seat and forming a neck portion therewith.

5. A fluid valve according to claim 1, wherein said seat fitting including a threaded portion threaded into said intersecting bore and includes an external head portion of greater diameter than said threaded portion, and an O-ring disposed between said head portion and said body.

References Cited by the Examiner

UNITED STATES PATENTS

| | | | |
|---|---|---|---|
| 1,588,562 | 6/1926 | Vives | 251—320 |
| 1,747,624 | 2/1930 | Gilsenan | 137—801 X |
| 2,257,895 | 10/1941 | Woodford et al. | 137—801 |
| 2,616,512 | 11/1952 | Coon. | |
| 2,629,579 | 2/1953 | Paul | 251—320 |
| 3,210,043 | 10/1965 | Burzlaff | 251—320 |

FOREIGN PATENTS 946,111  12/1948  France.

M. CARY NELSON, *Primary Examiner.*

A. ROSENTHAL, *Assistant Examiner.*